(12) United States Patent
Higashiyama et al.

(10) Patent No.: US 10,917,004 B2
(45) Date of Patent: Feb. 9, 2021

(54) SNUBBER CIRCUIT AND POWER CONVERSION SYSTEM USING SAME

(71) Applicant: PANASONIC INTELLECTUAL PROPERTY MANAGEMENT CO., LTD., Osaka (JP)

(72) Inventors: Koji Higashiyama, Osaka (JP); Fumito Kusama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/471,325

(22) PCT Filed: Dec. 12, 2017

(86) PCT No.: PCT/JP2017/044455
§ 371 (c)(1),
(2) Date: Jun. 19, 2019

(87) PCT Pub. No.: WO2018/123552
PCT Pub. Date: Jul. 5, 2018

(65) Prior Publication Data
US 2020/0220450 A1  Jul. 9, 2020

(30) Foreign Application Priority Data

Dec. 27, 2016 (JP) .................. 2016-254527

(51) Int. Cl.
*H02M 3/335* (2006.01)
*H02M 1/34* (2007.01)
*H02M 5/22* (2006.01)

(52) U.S. Cl.
CPC ......... *H02M 1/34* (2013.01); *H02M 3/33569* (2013.01); *H02M 5/225* (2013.01); *H02M 2001/342* (2013.01)

(58) Field of Classification Search
CPC ............... H02M 1/34; H02M 3/33569; H02M 3/33576; H02M 3/33584
See application file for complete search history.

(56) References Cited

U.S. PATENT DOCUMENTS 5,684,678 A     11/1997  Barrett
5,898,581 A  *   4/1999  Liu ........................ H02M 1/34
                                                    363/132

(Continued)

FOREIGN PATENT DOCUMENTS

JP   H03-007073 A    1/1991
JP   H09-247935 A    9/1997

(Continued)

OTHER PUBLICATIONS

International Search Report and Written Opinion issued in International Patent Application No. PCT/JP2017/044455, dated Jan. 30, 2018; with partial English translation.

(Continued)

*Primary Examiner* — Thienvu V Tran
*Assistant Examiner* — Sisay G Tiku
(74) *Attorney, Agent, or Firm* — McDermott Will and Emery LLP

(57) ABSTRACT

A snubber circuit includes a clamp circuit and a voltage conversion circuit. The clamp circuit is configured to absorb electrical energy of a main circuit from a pair of secondary-side voltage points on a secondary side of the main circuit to clamp a secondary-side voltage. The main circuit is of insulating type and is configured to perform electric power conversion. The voltage conversion circuit which is of insulating type is electrically connected to a pair of primary-side voltage points on a primary side of the main circuit and is configured to subject, to direct-current conversion, the direct-current voltage generated by the clamp circuit and output the direct-current voltage to the pair of primary-side (Continued)

voltage points. The voltage conversion circuit includes a transformer, a first capacitance component electrically connected to a primary winding wire of the transformer, and a second capacitance component electrically connected to a secondary winding wire of the transformer.

12 Claims, 10 Drawing Sheets

(56) References Cited

U.S. PATENT DOCUMENTS

| | | | |
|---|---|---|---|
| 6,400,584 B1* | 6/2002 | Sabate | H02M 1/44 |
| | | | 363/17 |
| 2009/0086520 A1* | 4/2009 | Nishimura | H02J 3/383 |
| | | | 363/133 |
| 2010/0315839 A1* | 12/2010 | Yang | H02M 3/33576 |
| | | | 363/17 |
| 2011/0317452 A1* | 12/2011 | Anguelov | H02M 3/33592 |
| | | | 363/21.02 |
| 2016/0141970 A1 | 5/2016 | Fukuda et al. | |
| 2019/0199241 A1* | 6/2019 | Murakami | H02M 1/34 |
| 2019/0334430 A1* | 10/2019 | Higashiyama | H02M 3/155 |
| 2020/0044573 A1* | 2/2020 | Kusama | H02M 3/337 |
| 2020/0052601 A1* | 2/2020 | Kamon | H02M 7/515 |

FOREIGN PATENT DOCUMENTS

| | | |
|---|---|---|
| JP | H10-066335 A | 3/1998 |
| JP | 2004-135408 A | 4/2004 |
| JP | 2013-240168 A | 11/2013 |
| JP | 2016-103969 A | 6/2016 |

OTHER PUBLICATIONS

European Search Report dated Nov. 19, 2019 issued for the corresponding European Patent Application No. 17887469.9.

* cited by examiner

SNUBBER CIRCUIT AND POWER CONVERSION SYSTEM USING SAME

CROSS-REFERENCE OF RELATED APPLICATIONS

This application is the U.S. National Phase under 35 U.S.C. § 371 of International Patent Application No. PCT/JP2017/044455, filed on Dec. 12, 2017, which in turn claims the benefit of Japanese Application No. 2016-254527, filed on Dec. 27, 2016, the entire disclosures of which Applications are incorporated by reference herein.

TECHNICAL FIELD

The present disclosure generally relates to snubber circuits and power conversion systems using the snubber circuits, and specifically to a snubber circuit for suppressing a ringing or surge voltage and a power conversion system using the snubber circuit.

BACKGROUND ART

Patent Literature 1 discloses, in a power-converting device configured to convert direct-current power supplied from a direct-current power supply into alternating-current power, a DC/DC converter (snubber circuit) configured to regenerate energy due to an overvoltage along with switching in the direct-current power supply.

The power-converting device disclosed in Patent Literature 1 includes a bidirectional switch inserted in and connected to a secondary circuit of a transformer. A capacitor is connected via a full-wave rectifier circuit to a circuit location where the overvoltage along with the switching of the bidirectional switch is absorbable. Electric charges accumulated in the capacitor are regenerated via the DC/DC converter in the direct-current power supply.

In the snubber circuit described in Patent Literature 1, ringing occurs due to switching of a switch included in the snubber circuit, which leads to increased loss in the snubber circuit.

CITATION LIST

Patent Literature

Patent Literature 1: JP H03-7073 A

SUMMARY OF INVENTION

In view of the foregoing, it is an object of the present disclosure to provide a snubber circuit configured to reduce loss and a power conversion system using the snubber circuit.

A snubber circuit of a first aspect includes a clamp circuit and a voltage conversion circuit. The clamp circuit is configured to absorb electrical energy of a main circuit from a pair of secondary-side voltage points on a secondary side of the main circuit to clamp a voltage between the pair of secondary-side voltage points. The main circuit is of insulating type. The main circuit is configured to perform electric power conversion. The voltage conversion circuit is electrically connected to the clamp circuit and a pair of primary-side voltage points on a primary side of the main circuit. The voltage conversion circuit is of insulating type. The voltage conversion circuit is configured to subject, to direct-current conversion, a direct-current voltage generated by the clamp circuit absorbing the electrical energy to obtain converted direct-current voltage and output the converted direct-current voltage to the pair of primary-side voltage points. The voltage conversion circuit includes a transformer, a first capacitance component electrically connected to a primary winding wire of the transformer, and a second capacitance component electrically connected to a secondary winding wire of the transformer.

In a snubber circuit of a second aspect referring to the first aspect, the voltage conversion circuit is configured such that an excitation current flowing through the primary winding wire of the transformer is larger than a load current supplied via the pair of primary-side voltage points to the main circuit.

In a snubber circuit of a third aspect referring to the first or second aspect, the voltage conversion circuit is configured to operate at a drive frequency higher than a drive frequency of the main circuit.

In a snubber circuit of a fourth aspect referring to any one of the first to third aspects, the voltage conversion circuit includes a half-bridge connection of a first switch and a second switch, and the first switch and the second switch are electrically connected to the primary winding wire of the transformer.

In a snubber circuit of a fifth aspect referring to any one of the first to fourth aspects, the first capacitance component is electrically connected in parallel to the primary winding wire of the transformer.

In a snubber circuit of a sixth aspect referring to any one of the first to fifth aspects, the voltage conversion circuit includes a rectifier circuit configured to rectify a voltage across the secondary winding wire of the transformer, and the second capacitance component is electrically connected between output ends of the rectifier circuit.

In a snubber circuit of a seventh aspect referring to any one of the first to sixth aspects, the voltage conversion circuit includes an inductor electrically connected between the second capacitance component and at least one of the pair of primary-side voltage points.

In a snubber circuit of an eighth aspect referring to any one of the first to seventh aspects, the pair of secondary-side voltage points is a connection point of a secondary side of a high-frequency isolation transformer included in the main circuit and an inverter circuit configured to subject, to alternating-current conversion, an alternating-current voltage on the secondary side of the high-frequency isolation transformer. The clamp circuit is configured to absorb electrical energy of a ringing component between the pair of secondary-side voltage points.

A power conversion system of a ninth aspect includes the snubber circuit of any one of the first to eighth aspects and the main circuit.

In a power conversion system of a tenth aspect referring to the ninth aspect, the main circuit includes at least two primary-side terminals, at least two secondary-side terminals, and a high-frequency isolation transformer electrically connected between the at least two primary-side terminals and the at least two secondary-side terminals, the main circuit being configured to convert electric power between the at least two primary-side terminals and the at least two secondary-side terminals via the high-frequency isolation transformer.

DESCRIPTION OF EMBODIMENTS (1) Schema

First, a schema of a snubber circuit according to the present embodiment and a power conversion system using the snubber circuit will be described with reference to FIG. 1.

A power conversion system 1 includes a main circuit 2 and a snubber circuit 3. The main circuit 2 is a power conversion circuit configured to convert electric power. The snubber circuit 3 is a protection circuit configured to suppress a ringing or surge voltage generated by the main circuit 2. When the main circuit 2 converts, for example, direct-current power into alternating-current power or the alternating-current power into the direct-current power, ringing may occur due to leakage inductance of a transformer which will be described later. The power conversion system 1 according to the present embodiment enables the snubber circuit 3 to reduce such ringing. The snubber circuit 3 corresponds to a sub-circuit with respect to the main circuit 2.

Figure 1:
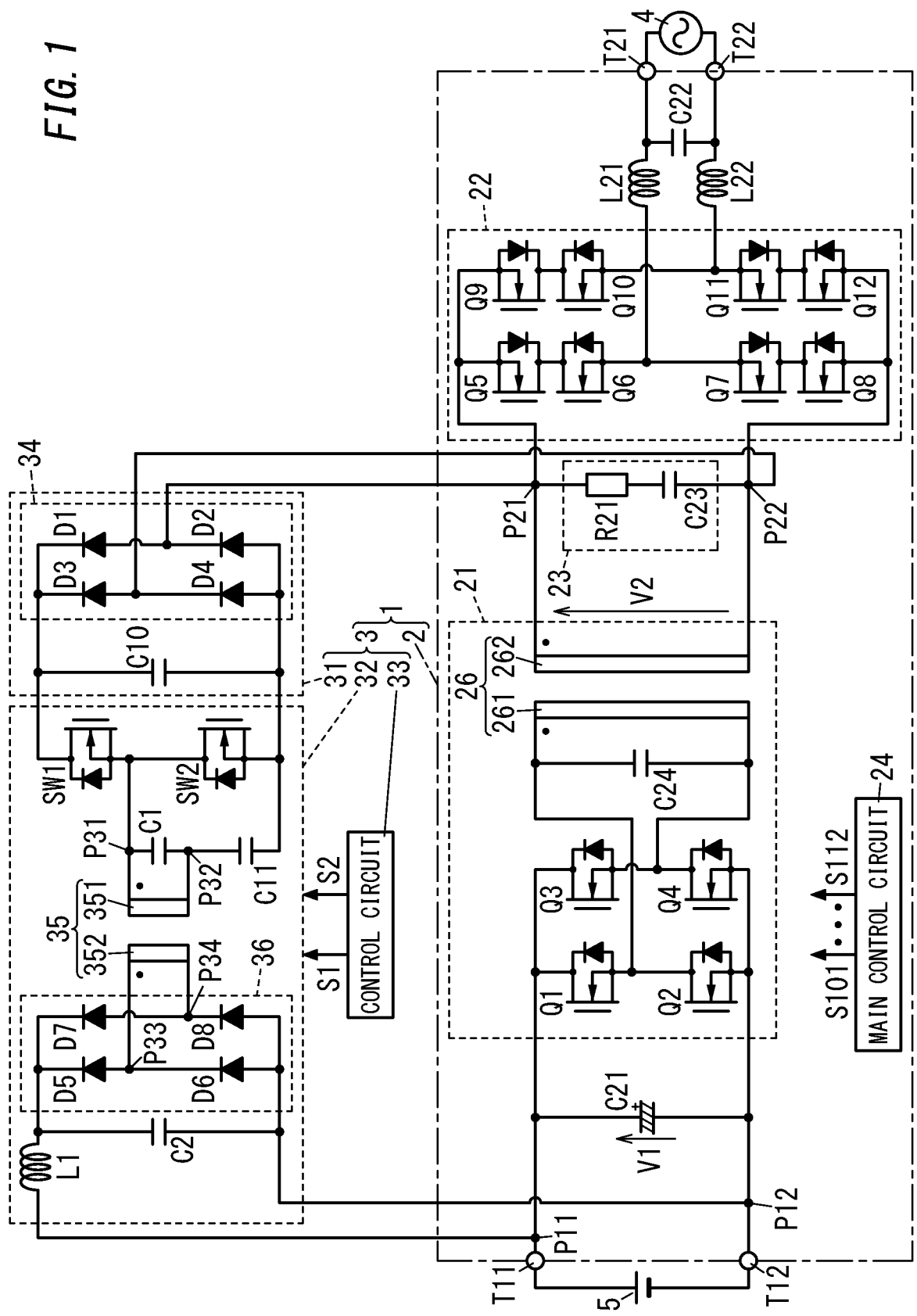
FIG. 1 is a circuit diagram illustrating a power conversion system including a snubber circuit of one embodiment of the present disclosure.

The power conversion system 1 is used for electric power conversion, for example, between a power system 4 and a storage battery 5 as illustrated in FIG. 1. As used herein, the term "power system" means an entire system based on which an electricity supplier such as an electric power company supplies electric power to a power receiving facility of a consumer. In the example shown in FIG. 1, the power conversion system 1 includes a pair of primary-side terminals T11 and T12 to which the storage battery 5 is electrically connected and a pair of secondary-side terminals T21 and T22 to which the power system 4 is electrically connected. The power conversion system 1 converts alternating-current power input from the power system 4 into direct-current power and supplies the direct-current power to the storage battery 5 so as to charge the storage battery 5. Moreover, the power conversion system 1 converts direct-current power input from the storage battery 5 into alternating-current power and outputs the alternating-current power to the power system 4 so as to discharge the storage battery 5.

In the present embodiment, the power conversion system 1 is configured to bidirectionally convert electric power between the pair of primary-side terminals T11 and T12 and the pair of secondary-side terminals T21 and T22 so as to be compatible with both charging and discharging of the storage battery 5. Thus, the power conversion system 1 connects and systematically links the storage battery 5 to the power system 4 to enable the storage battery 5 to be charged with electric power supplied from the power system 4 and/or to enable a load connected to the power system 4 to be supplied with discharged electric power of the storage battery 5. In the present embodiment, for example, a description is given of a case where a power storage system including the power conversion system 1 and the storage battery 5 is introduced into a non-dwelling facility such as an office building, a hospital, a commercial facility, or a school.

(2) Configuration (2.1) Configuration of Main Circuit

First, a configuration of the main circuit 2 which, together with the snubber circuit 3, forms the power conversion system 1 will be described with reference to FIG. 1.

The main circuit 2 includes the pair of primary-side terminals T11 and T12, the pair of secondary-side terminals T21 and T22, a first converter 21, a second converter 22, an RC snubber 23, a main control circuit 24, capacitors C21 and C22, and inductors L21 and L22.

In the example shown in FIG. 1, the storage battery 5 is electrically connected between the pair of primary-side terminals T11 and T12 such that the primary-side terminal T11 is located on a high-potential (positive-electrode) side. Moreover, the power system 4 is electrically connected between the pair of secondary-side terminals T21 and T22. Note that as used herein, the term "terminal" does not have to mean a component for connecting an electric wire and the like but may be, for example, a lead of an electronic component or part of a conductor included in a circuit board.

The capacitor C21 is, in this embodiment, an electrolytic capacitor and is electrically connected between the pair of primary-side terminals T11 and T12. In other words, the capacitor C21 is electrically connected in series between a pair of primary-side voltage points P11 and P12. The snubber circuit 3 is electrically connected between the pair of primary-side voltage points P11 and P12, which will be described later. While the main circuit 2 operates, a bus voltage V1 which is a direct-current voltage is generated between the pair of primary-side voltage points P11 and P12. The capacitor C21 has a function of stabilizing the bus voltage V1.

The RC snubber 23 includes a resistor R21 and a capacitor C23. The resistor R21 and the capacitor C23 are electrically connected in series between a pair of secondary-side voltage points P21 and P22. The snubber circuit 3 is electrically connected between the pair of secondary-side voltage points P21 and P22, which will be described later. While the main circuit 2 operates, a secondary-side voltage V2 obtained by alternately inverting the polarity of the bus voltage V1 is generated at the pair of secondary-side voltage points P21 and P22.

The first converter 21 is electrically connected between the capacitor C21 and the RC snubber 23. The first converter 21 includes a transformer 26, first to fourth switching elements Q1 to Q4, and a capacitor C24. The first converter 21 includes a DC/AC inverter of insulating type. The DC/AC inverter is configured to convert a direct-current voltage into an alternating-current voltage, or the alternating-current voltage into the direct-current voltage between the capacitor C21 and the RC snubber 23.

In the present embodiment, for example, each of the first to fourth switching elements Q1 to Q4 is an n-channel depletion Metal-Oxide-Semiconductor Field Effect Transistor (MOSFET). The first to fourth switching elements Q1 to Q4 are connected in a full-bridge configuration. Between both the ends of the capacitor C21, the first switching element Q1 is electrically connected in series to the second switching element Q2. Between both the ends of the capacitor C21, the third switching element Q3 is electrically connected in series to the fourth switching element Q4. In other words, between the pair of primary-side voltage points P11 and P12, a series circuit of the first switching element Q1 and the second switching element Q2 is electrically connected in parallel to a series circuit of the third switching element Q3 and the fourth switching element Q4. Specifically, the drain of the first switching element Q1 and the drain of the third switching element Q3 are both electrically connected to the primary-side voltage point P11 of the pair of primary-side voltage points P11 and P12 which is on the high-potential side. The source of the second switching element Q2 and the source of the fourth switching element Q4 are both electrically connected to the primary-side voltage point P12 of the pair of primary-side voltage points P11 and P12 which is on a low-potential side.

The transformer 26 is a high-frequency isolation transformer including a primary winding wire 261 and a secondary winding wire 262 which are magnetically connected to each other. The primary winding wire 261 is electrically connected between a connection point of the source of the first switching element Q1 and the drain of the second switching element Q2 and a connection point of the source of the third switching element Q3 and the drain of the fourth switching element Q4. Moreover, the capacitor C24 is electrically connected between both ends of the primary winding wire 261. The secondary winding wire 262 is electrically connected between the pair of secondary-side voltage points P21 and P22. In the present embodiment, for example, the turns ratio of the primary winding wire 261 to the secondary winding wire 262 is 1:1.

The second converter 22 is electrically connected between the pair of secondary-side voltage points P21 and P22 and the pair of secondary-side terminals T21 and T22. The second converter 22 includes fifth to twelfth switching elements Q5 to Q12. The second converter 22 serves as an AC/AC converter (inverter circuit) between the pair of secondary-side voltage points P21 and P22 and the pair of secondary-side terminals T21 and T22 to convert an alternating-current voltage into an alternating-current voltage.

In the present embodiment, for example, each of the fifth to twelfth switching elements Q5 to Q12 is an n-channel depletion MOSFET. A pair of the fifth and sixth switching elements Q5 and Q6, a pair of the seventh and eighth switching elements Q7 and Q8, a pair of the ninth and tenth switching elements Q9 and Q10, and a pair of the eleventh and twelfth switching elements Q11 and Q12 are in a full-bridge configuration. The two switching elements in each pair are connected in series in reverse direction such that their drains are electrically connected. The two switching elements in each pair enable bidirectional conduction/interruption of a current. The pair of fifth and sixth switching elements Q5 and Q6 is electrically connected in series to the pair of seventh and eighth switching elements Q7 and Q8 between the pair of secondary-side voltage points P21 and P22. The pair of ninth and tenth switching elements Q9 and Q10 is electrically connected in series to the pair of eleventh and twelfth switching elements Q11 and Q12 between the pair of secondary-side voltage points P21 and P22. In other words, between the pair of secondary-side voltage points P21 and P22, a series circuit of the fifth to eighth switching elements Q5 to Q8 is electrically connected in parallel to a series circuit of the ninth to twelfth switching elements Q9 to Q12. Specifically, both the source of the fifth switching element Q5 and the source of the ninth switching element Q9 are electrically connected to the secondary-side voltage point P21 of the pair of secondary-side voltage points P21 and P22. The source of the eighth switching element Q8 and the source of the twelfth switching element Q12 are both electrically connected to the secondary-side voltage point P22 of the pair of secondary-side voltage points P21 and P22. The source of the sixth switching element Q6 is electrically connected to the source of the seventh switching element Q7, and a connection point of the source of the sixth switching element Q6 and the source of the seventh switching element Q7 is electrically connected via the inductor L21 to the secondary-side terminal T21 of the pair of secondary-side terminals T21 and T22. The source of the tenth switching element Q10 is electrically connected to the source of the eleventh switching element Q11, and a connection point of the source of the tenth switching element Q10 and the source of the eleventh switching element Q11 is electrically connected via the inductor L22 to the secondary-side terminal T22 of the pair of secondary-side terminals T21 and T22. Moreover, the capacitor C22 is electrically connected between the pair of secondary-side terminals T21 and T22.

The main control circuit 24 outputs control signals S101 to S112 for controlling the first to twelfth switching elements Q1 to Q12. The control signals S101 to S112 are respectively applied to the gates of the first to twelfth switching elements Q1 to Q12 directly or via a drive circuit so as to individually turn on/off the first to twelfth switching elements Q1 to Q12. The main control circuit 24 controls the first to twelfth switching elements Q1 to Q12 based on a Pulse Width Modulation (PWM) system which enables the duty ratio to be adjusted. The main control circuit 24 includes, for example, a microcomputer including a Central Processing Unit (CPU), a Field-Programmable Gate Array (FPGA), or Application Specific Integrated Circuit (ASIC).

(2.2) Configuration of Snubber Circuit

Next, a configuration of the snubber circuit 3 will be described with reference to FIG. 1.

As illustrated in FIG. 1, the snubber circuit 3 is electrically connected to a pair of primary-side voltage points P11 and P12 and a pair of secondary-side voltage points P21 and P22 of the main circuit 2. That is, the main circuit 2 includes the pair of primary-side voltage points P11 and P12 and the pair of secondary-side voltage points P21 and P22 electrically connected to the snubber circuit 3.

The snubber circuit 3 includes a clamp circuit 31, a voltage conversion circuit 32, and a control circuit 33.

The clamp circuit 31 is a circuit configured to, when the absolute value of a secondary-side voltage V2 generated between the pair of secondary-side voltage points P21 and P22 of the main circuit 2 exceeds a clamp value, absorb electrical energy of the main circuit 2 from the pair of secondary-side voltage points P21 and P22. Thus, the clamp circuit 31 clamps, to a clamp value, the absolute value of the secondary-side voltage V2 generated between the pair of secondary-side voltage points P21 and P22. That is, when the absolute value of the secondary-side voltage V2 in the main circuit 2 exceeds the clamp value, the clamp circuit 31 extracts electrical energy corresponding to the difference between the secondary-side voltage V2 and the clamp value from the main circuit 2, thereby clamping the upper limit of the absolute value of the secondary-side voltage V2 to the clamp value.

The clamp circuit 31 includes a rectifier circuit 34 and a capacitor C10. The rectifier circuit 34 includes first to fourth diodes D1 to D4 in a full-bridge configuration. The first diode D1 is electrically connected in series to the second diode D2 between the both ends of the capacitor C10. The third diode D3 is electrically connected in series to the fourth diode D4 between the both ends of the capacitor C10. In other words, between the both ends of the capacitor C10, a series circuit of the first diode D1 and the second diode D2 and a series circuit of the third diode D3 and the fourth diode D4 are electrically connected in parallel to each other. Specifically, both the cathode of the first diode D1 and the cathode of the third diode D3 are electrically connected to a high-potential-side terminal of the capacitor C10. Both the anode of the second diode D2 and the anode of the fourth diode D4 are electrically connected to a low potential side terminal of the capacitor C10. A connection point of the anode of the first diode D1 and the cathode of the second diode D2 is electrically connected to the secondary-side voltage point P21 of the pair of secondary-side voltage points P21 and P22. A connection point of the anode of the third diode D3 and the cathode of the fourth diode D4 is electrically connected to the secondary-side voltage point P22 of the pair of secondary-side voltage points P21 and P22.

That is, the capacitor C10 is electrically connected via the rectifier circuit 34 to the secondary-side voltage points P21 and P22 and receives a voltage obtained by full wave rectification of the secondary-side voltage V2. It is assumed that the magnitude of the voltage across the capacitor C10 corresponds to the clamp value. In this case, when the absolute value of the secondary-side voltage V2 exceeds the clamp value, the first and fourth diodes D1 and D4 or the second and third diodes D2 and D3 are turned on and a current flows through the capacitor C10. In other words, when the absolute value of the secondary-side voltage V2 exceeds the clamp value, the capacitor C10 absorbs electrical energy from the main circuit 2. In a strict sense, the clamp value is a voltage obtained by adding forward direction drop voltages of the first and fourth diodes D1 and D4 or the second and third diodes D2 and D3 to a voltage across the capacitor C10. Note that each of the forward direction drop voltages of the first to fourth diodes D1 to D4 are sufficiently smaller than the clamp value, and therefore, in the present embodiment, values of the forward direction drop voltages of the first to fourth diodes D1 to D4 are zero, that is, the magnitude of the voltage across the capacitor C10 corresponds to the clamp value.

The voltage conversion circuit 32 is electrically connected between the clamp circuit 31 and the pair of primary-side voltage points P11 and P12 of the main circuit 2 and regenerates electrical energy accumulated in the capacitor C10 from the primary-side voltage points P11 and P12 in the main circuit 2.

The voltage conversion circuit 32 is a DC/DC converter of insulating type. The DC/DC converter includes a transformer 35, a rectifier circuit 36, first and second switches SW1 and SW2, first and second capacitive elements C1 and C2, a smoothing capacitor C11, and an inductor L1. In the present embodiment, for example, each of the first switch SW1 and the second switch SW2 is an n-channel depletion MOSFET. Moreover, the first and second capacitive elements C1 and C2 are capacitors.

The first switch SW1 is electrically connected in series to the second switch SW2 between the both ends of the capacitor C10. In other words, between the both ends of the capacitor C10, a half-bridge connection of the first switch SW1 and the second switch SW2 is formed. The drain of the first switch SW1 is electrically connected to the high-potential-side terminal of the capacitor C10. The source of the second switch SW2 is electrically connected to the low-potential-side terminal of the capacitor C10.

The transformer 35 includes a primary winding wire 351 and a secondary winding wire 352 which are magnetically connected to each other. Specifically, the primary winding wire 351 is electrically connected in series to the smoothing capacitor C11 between the both ends of the second switch SW2. Specifically, the primary winding wire 351 has one end electrically connected to a connection point of the source of the first switch SW1 and the drain of the second switch SW2. Moreover, the primary winding wire 351 has the other end electrically connected via the smoothing capacitor C11 to the source of the second switch SW2. A voltage point on one end side of the primary winding wire 351 is a first voltage point P31, and a voltage point on the other end side of the primary winding wire 351 is a second voltage point P32.

The first capacitive element C1 is electrically connected between the first and second voltage points P31 and P32. In other words, the first capacitive element C1 is electrically connected in parallel to the primary winding wire 351. The first capacitive element C1 is a capacitor for resonance.

The secondary winding wire 352 is electrically connected via the rectifier circuit 36 to the second capacitive element C2. The second capacitive element C2 is a capacitor for resonance. The rectifier circuit 36 includes fifth to eighth diodes D5 to D8 in a full-bridge configuration. The fifth diode D5 is electrically connected in series to the sixth diode D6 between the both ends of the second capacitive element C2. The seventh diode D7 is electrically connected in series to the eighth diode D8 between the both ends of the second capacitive element C2. In other words, between the both ends of the second capacitive element C2, a series circuit of the fifth diode D5 and the sixth diode D6 and a series circuit of the seventh diode D7 and the eighth diode D8 are electrically connected in parallel to each other. Specifically, both the cathode of the fifth diode D5 and the cathode of the seventh diode D7 are electrically connected to a high-potential-side terminal of the second capacitive element C2. Both the anode of the sixth diode D6 and the anode of the eight diode D8 are electrically connected to a low potential side terminal of the second capacitive element C2. A connection point of the anode of the fifth diode D5 and the cathode of the sixth diode D6 is electrically connected the one end of the secondary winding wire 352. A connection point of the anode of the seventh diode D7 and the cathode of the eighth diode D8 is electrically connected the other end of the secondary winding wire 352. A voltage point on one end side of the secondary winding wire 352 is a third voltage point P33, and a voltage point on the other end side of the secondary winding wire 352 is a fourth voltage point P34.

The second capacitive element C2 is electrically connected via the inductor L1 to the pair of primary-side voltage points P11 and P12 in the main circuit 2. Specifically, the second capacitive element C2 has a high-potential-side terminal electrically connected via the inductor L1 to the primary-side voltage point P11 of the pair of primary-side voltage points P11 and P12 which is on the high voltage side.

The second capacitive element C2 has a low-potential-side terminal electrically connected to the primary-side voltage point P12 of the pair of primary-side voltage points P11 and P12 which is on the low voltage side. The inductor L1 is a choke coil for smoothing. Note that the inductor L1 may be electrically connected between the low potential side terminal of the second capacitive element C2 and the primary-side voltage point P12. Alternatively, the inductor L1 may be electrically connected both between the high potential side terminal of the second capacitive element C2 and the primary-side voltage point P11 and between the low potential side element of the second capacitive element C2 and the primary-side voltage point P12.

The control circuit 33 outputs control signals S1 and S2 for respectively controlling the first switch SW1 and the second switch SW2. The control signals S1 and S2 are respectively applied to the gate of the first switch SW1 and the gate of the second switch SW2 directly or via a drive circuit to individually turn on/off the first switch SW1 and the second switch SW2. The control circuit 33 controls the first switch SW1 and the second switch SW2 at a prescribed duty ratio. In the present embodiment, for example, the control circuit 33 controls the first switch SW1 and the second switch SW2 at the same duty ratio. The control circuit 33 is an autonomous control circuit which performs feedback control by using an analog circuit. The control circuit 33 includes, for example, an FPGA or an ASIC.

(3) Operation (3.1) Operation of Main Circuit

With reference to FIG. 1, operation of the main circuit 2 will be briefly described below.

In the present embodiment, the power conversion system 1 is, as described above, configured to bidirectionally convert electric power between the pair of primary-side terminals T11 and T12 and the pair of secondary-side terminals T21 and T22. Thus, the main circuit 2 has two operation modes, namely an "inverter mode" and a "converter mode". The inverter mode is an operation mode in which the direct-current power input to the pair of primary-side terminals T11 and T12 is converted into the alternating-current power to output the alternating-current power from the pair of secondary-side terminals T21 and T22. The converter mode is an operation mode in which the alternating-current power input to the pair of secondary-side terminals T21 and T22 is converted into the direct-current power to output the direct-current power from the pair of primary-side terminals T11 and T12. That is, in the converter mode, the main circuit 2 supplies electric power from the secondary side to the primary side.

First, operation of the main circuit 2 in the inverter mode will be described. Here, it is assumed that the magnitude of the voltage between the pair of primary-side terminals T11 and T12, that is, the voltage across the capacitor C21 is "+E". In other words, the magnitude of the bus voltage V1 between the pair of primary-side voltage points P11 and P12 is assumed to be "+E".

The main control circuit 24 controls the first to fourth switching elements Q1 to Q4 of the first converter 21 such that a combination of the first and fourth switching elements Q1 and Q4 and a combination of the second and third switching elements Q2 and Q3 are alternately turned on. In the present embodiment, for example, a drive frequency at which the first to fourth switching elements Q1 to Q4 are turned on/off is 20 kHz. Here, the duty ratio of each of the first and fourth switching elements Q1 and Q4 (or second and third switching elements Q2 and Q3) is 50%. Thus, when the first and fourth switching elements Q1 and Q4 are ON, the magnitude of the voltage across the primary winding wire 261 of the transformer 26 is "+E". Moreover, when the second and third switching elements Q2 and Q3 are ON, the magnitude of the voltage across the primary winding wire 261 of the transformer 26 is "−E". Thus, the magnitude of the voltage across the secondary winding wire 262 alternately changes between "+E" and "−E". That is, the secondary-side voltage V2 between the pair of secondary-side voltage points P21 and P22 is a voltage obtained by alternately converting the polarity of the bus voltage V1 between the pair of primary-side voltage points P11 and P12.

During a time period during which voltages at the pair of secondary-side voltage points P21 and P22 are fixed, the main control circuit 24 performs PWM control of the second converter 22, thereby controlling the output voltage of the second converter 22. Specifically, during a time period during which the magnitude of the voltage between the pair of secondary-side voltage points P21 and P22 is fixed to "+E", a time period during which the pair of fifth and sixth switching elements Q5 and Q6 and the pair of eleventh and twelfth switching elements Q11 and Q12 are ON is referred to as a first supply time period. During the first supply time period, a current is supplied from the secondary winding wire 262 via the second converter 22 to the pair of secondary-side terminals T21 and T22. On the other hand, a time period during which the pair of seventh and eighth switching elements Q7 and Q8 and the pair of eleventh and twelfth switching elements Q11 and Q12 are ON is referred to as a circulation time period. During the circulation time period, a current flows from the inductors L21 and L22 through the second converter 22 as a feedback path. Moreover, during a time period during which the magnitude of the voltage between the pair of secondary-side voltage points P21 and P22 is fixed to "−E", a time period during which the pair of seventh and eighth switching elements Q7 and Q8 and the pair of ninth and tenth switching elements Q9 and Q10 are ON is referred to as a second supply time period. During the second supply time period, a current is supplied from the secondary winding wire 262 via the second converter 22 to the pair of secondary-side terminals T21 and T22. On the other hand, during the circulation time period during which the pair of seventh and eighth switching elements Q7 and Q8 and the pair of the eleventh and twelfth switching elements Q11 and Q12 are ON, a current flows from the inductors L21 and L22 through the second converter 22 as a feedback path. Changing a ratio of each of the first and second supply time periods to the circulation time period controls the output voltage of the second converter 22. Inversion operation of the transformer 26 in the first converter 21 is performed during the circulation time period.

The main circuit 2 repeats the operation described above to convert direct-current power from the storage battery 5 into alternating-current power and outputs the alternating-current power from the pair of secondary-side terminals T21 and T22 to the power system 4.

Moreover, the main circuit 2 causes the first converter 21 and the second converter 22 to operate also in the converter mode based on a sequence basically similar to that in the inverter mode. That is, in the main circuit 2, when the output voltage of the second converter 22 is lower than the voltage of the power system 4, the alternating-current power from the power system 4 is converted into the direct-current power, which is output from the pair of primary-side terminals T11 and T12 to the storage battery 5.

Along with the operation of the main circuit 2 having such a configuration, ringing may occur in the secondary-side voltage V2 between the pair of secondary-side voltage points P21 and P22. That is, since the second converter 22 is connected via the transformer 26 to the storage battery 5 serving as a direct-current power supply, the second converter 22 may be deemed to be electrically connected via leakage inductance of the transformer 26 to the direct-current power supply (storage battery 5). Thus, during switching operation of the second converter 22, ringing may occur in the secondary-side voltage V2.

(3.2) Operation of Snubber Circuit

Next, operation of the snubber circuit 3 will be described with reference to FIG. 1.

When ringing occurs in the secondary-side voltage V2, the snubber circuit 3 absorbs electrical energy from the main circuit 2 by using the clamp circuit 31, thereby clamping the absolute value of the secondary-side voltage V2 to the clamp value.

The clamp circuit 31 is electrically connected to the pair of secondary-side voltage points P21 and P22 of the main circuit 2 and receives the secondary-side voltage V2 via the pair of secondary-side voltage points P21 and P22. The clamp circuit 31 performs rectification smoothing of the secondary-side voltage V2 by using the capacitor C10 and a rectifier circuit 34 including the first to fourth diodes D1 to D4. When ringing occurs in the secondary-side voltage V2, and the absolute value of the secondary-side voltage V2 exceeds the magnitude (clamp value) of the voltage across the capacitor C10, the first and fourth diodes D1 and D4 (or second and third diodes D2 and D3) are turned on to charge the capacitor C10. That is, when the absolute value of the secondary-side voltage V2 exceeds the clamp value, the snubber circuit 3 extracts, from the main circuit 2, electrical energy corresponding to a difference between the secondary-side voltage V2 and the clamp value to accumulate the electrical energy in the capacitor C10. Thus, even when ringing occurs in the secondary-side voltage V2, a maximum value of the absolute value of the secondary-side voltage V2 is suppressed to the clamp value.

Moreover, the snubber circuit 3 regenerates electrical energy accumulated in the capacitor C10 by using the voltage conversion circuit 32 from the pair of primary-side voltage points P11 and P12 in the main circuit 2. The control circuit 33 controls the first switch SW1 and the second switch SW2 such that the first switch SW1 and the second switch SW2 are alternately turned on. In the present embodiment, for example, a drive frequency at which the first switch SW1 and the second switch SW2 are turned on/off is 100 kHz. The first switch SW1 and the second switch SW2 are alternately turned on based on the control signals S1 and S2 from the control circuit 33, and thereby, the voltage conversion the 32 generates a direct-current output voltage between the pair of primary-side voltage points P11 and P12 of the main circuit 2, with the voltage across the capacitor C10 serving as an input voltage. That is, the voltage conversion circuit 32 subjects, to direct-current conversion, a direct-current voltage generated across the capacitor C10 by absorbing electrical energy from the main circuit 2 by using the clamp circuit 31 and then outputs the direct-current voltage to the pair of primary-side voltage points P11 and P12.

According to the operation described above, the snubber circuit 3 regenerates electrical energy of the main circuit 2 absorbed via the pair of secondary-side voltage points P21 and P22 from the pair of primary-side voltage points P11 and P12 in the main circuit 2.

(3.3) Soft Switching

Figure 2:
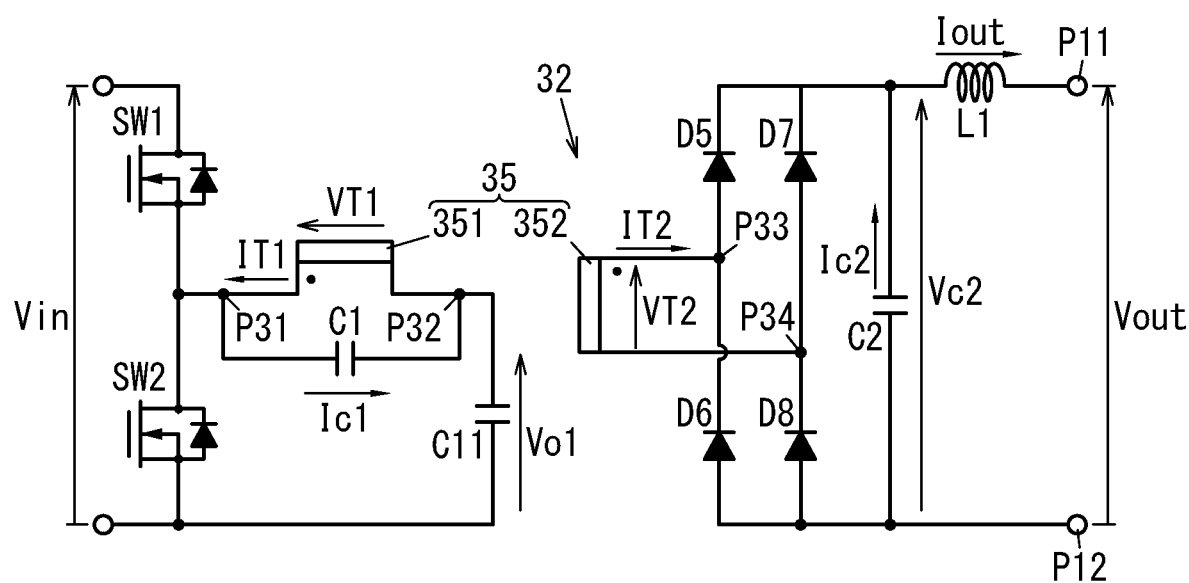
FIG. 2 is a circuit diagram illustrating the snubber circuit.

Next, soft switching operation in a voltage conversion circuit 32 of the snubber circuit 3 will be described with reference to FIG. 2. FIG. 2 shows the voltage conversion circuit 32 in the snubber circuit 3 of FIG. 1, wherein disposition of each elements in the circuit diagram is changed. The voltage conversion circuit 32 shown in FIG. 2 is equivalent to the voltage conversion circuit 32 shown in FIG. 1.

In the voltage conversion circuit 32, the first capacitive element C1 is electrically connected to the primary winding wire 351 of the transformer 35, the second capacitive element C2 is electrically connected to the secondary winding wire 352, and soft switching is realized by partial resonance.

The control circuit 33 controls the duty ratio of each of the first switch SW1 and the second switch SW2 at 50%. Thus, a voltage Vo1 across the smoothing capacitor C11 is expressed by the following expression [Formula 1] by using an input voltage Vin across the capacitor C10 in the clamp circuit 31.

$$Vo1 = \frac{Vin}{2} \quad \text{[Formula 1]}$$

Figure 3:
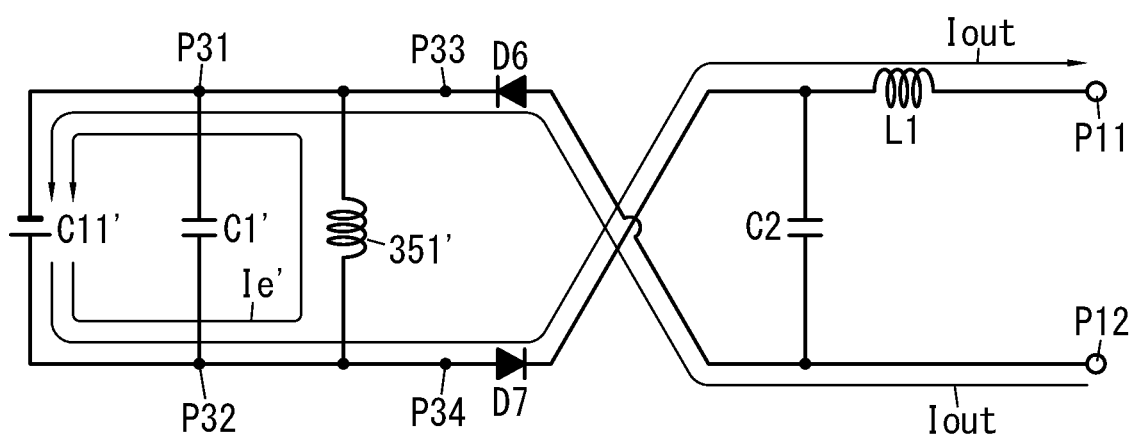
FIG. 3 is an equivalent circuit diagram illustrating a voltage conversion circuit in the snubber circuit.

When the first switch SW1 is OFF, and the second switch SW2 is ON, an equivalent circuit of secondary conversion in the voltage conversion circuit 32 is as shown in FIG. 3. In FIG. 3, the smoothing capacitor C11, the first capacitive element C1, and the primary winding wire 351 after the secondary conversion are respectively represented by "C11'", "C1'", and "351'".

When the second switch SW2 is ON, a voltage across the smoothing capacitor C11' with reference to the first voltage point P31 is Vo1/α. A peak value Iep' of an excitation current Ie'(=αIe) obtained by secondary conversion of an excitation current Ie flowing through the primary winding wire 351 of the transformer 35 is expressed by the following expression [Formula 2].

$$Iep' = \frac{\alpha Vo1}{2L} Ton \quad \text{[Formula 2]}$$

In Formula 2 above, α is a ratio (=n1/n2) of the turn n1 of the primary winding wire 351 to the turn n2 of the secondary winding wire 352 of the transformer 35. L is inductance of the primary winding wire 351, and "Ton" is an ON time of the first switch SW1 and the second switch SW2.

Here, the operation of the voltage conversion circuit 32 during the dead time Td during which the first switch SW1 and the second switch SW2 are OFF is in one of first to third cases described below in accordance with the magnitude of a load current Iout to be supplied to the main circuit 2.

Figure 4:
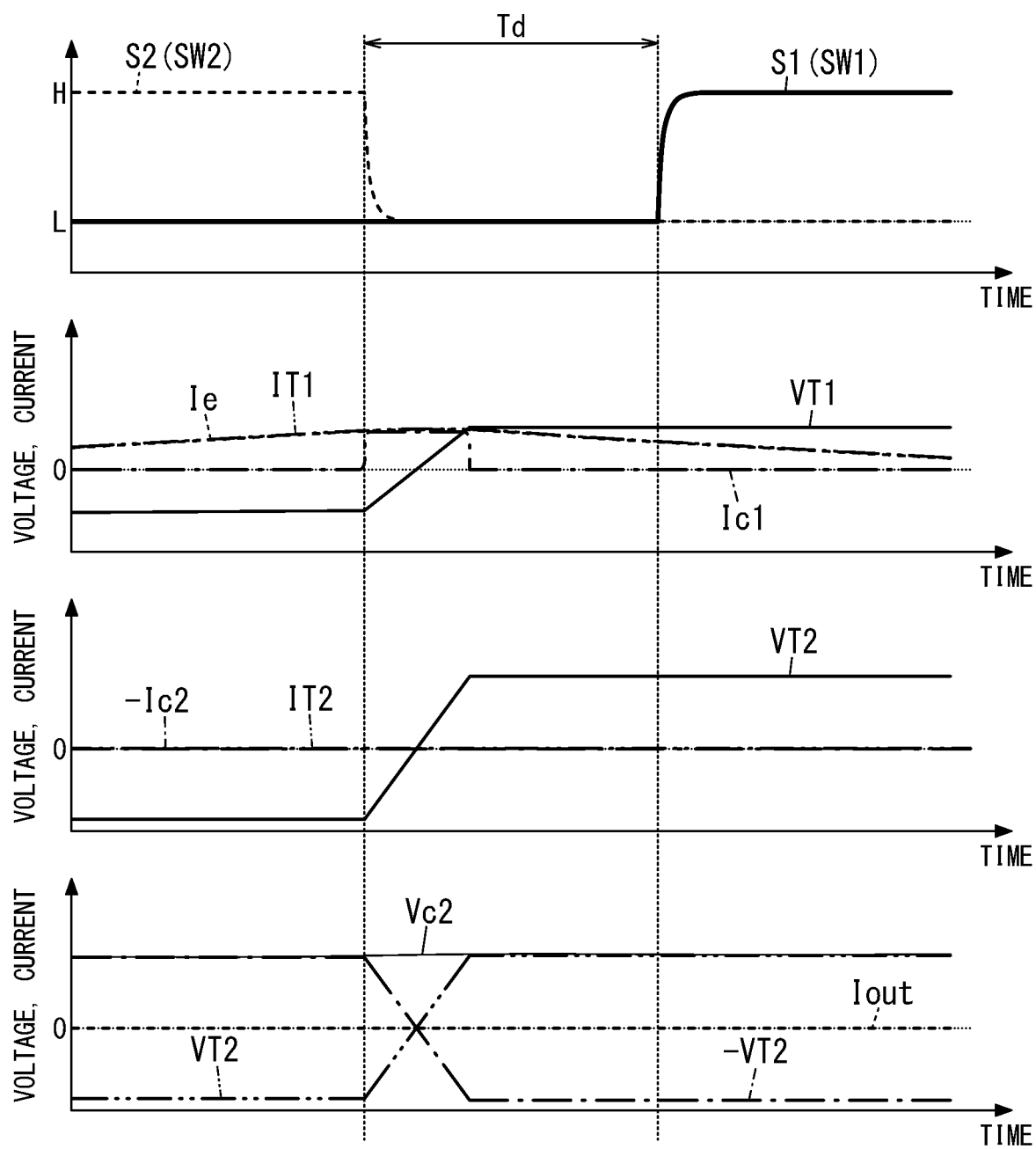
FIG. 4 is a waveform diagram illustrating operation of the voltage conversion circuit in the snubber circuit in a first case.

First, the first case will be described with reference to FIG. 4. A current flowing through the first capacitive element C1 is denoted by Ic1, a current flowing through the second capacitive element C2 is denoted by Ic2, a current flowing through the primary winding wire 351 is denoted by IT1, and a current flowing through the secondary winding wire 352 is denoted by IT2. Here, it is assumed that the magnitude of the load current Iout is zero, that is, the voltage conversion circuit 32 regenerates no electrical energy in the main circuit 2.

Figure 5:
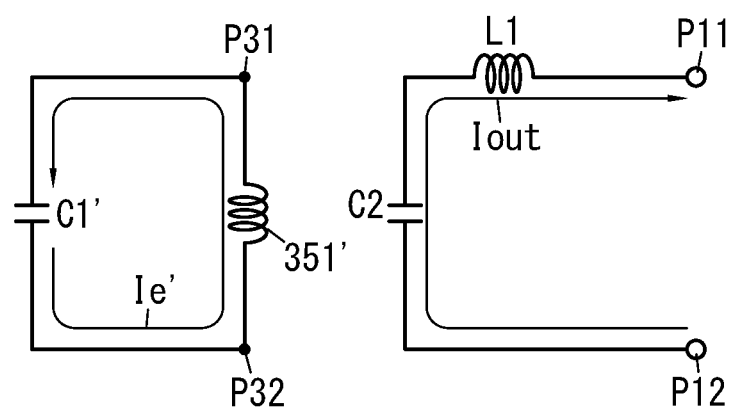
FIG. 5 is an equivalent circuit diagram illustrating a former phase of inversion operation of a transformer of the voltage conversion circuit in the snubber circuit in the first case.

The first case is a case where during the dead time Td, the polarity of the secondary voltage VT2 across the secondary winding wire 352 (the primary voltage VT1 between both ends of the primary winding wire 351) is inverted (reaches 0 V) earlier than that of the voltage Vc2 across the second capacitive element C2. That is, the absolute value of the secondary voltage VT2 decreases earlier than the voltage Vc2 across the second capacitive element C2. Thus, the fifth to eighth diodes D5 to D8 are turned off. An equivalent circuit of the voltage conversion circuit 32 in this case is shown in FIG. 5. The first capacitive element C1 is charged with only the excitation current Ie', and the second capacitive element C2 is discharged by only the load current Iout. In the example shown in FIG. 4, since the magnitude of the load current Iout is zero, the voltage Vc2 across the second capacitive element C2 is substantially constant.

Figure 6:
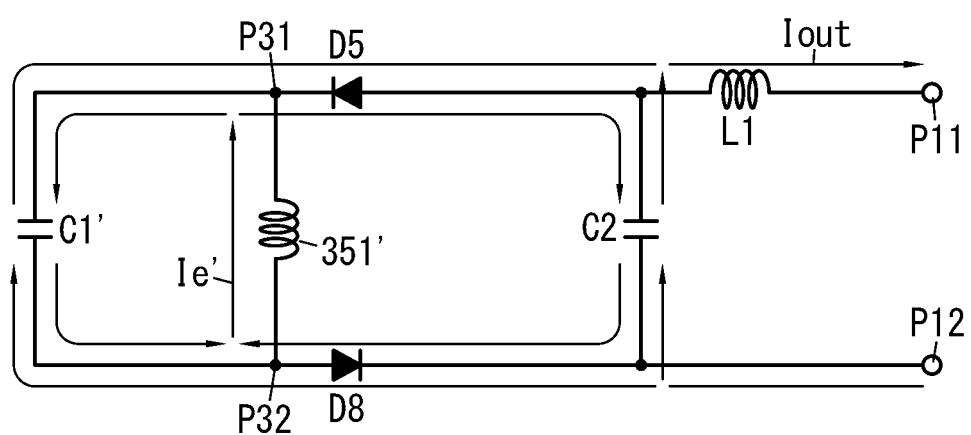
FIG. 6 is an equivalent circuit diagram illustrating a latter phase of the inversion operation of the transformer the voltage conversion circuit in the snubber circuit in the first case and a second case.

When after inversion of the polarity of the secondary voltage VT2, the secondary voltage VT2 exceeds the voltage Vc2 across the second capacitive element C2, the fifth and eighth diodes D5 and D8 are turned on. An equivalent circuit of the voltage conversion circuit 32 in this case is shown in FIG. 6. A combined capacitance of the first capacitive element C1' and the second capacitive element C2 is charged with a current obtained by subtracting the load current Iout from the excitation current Ie'. Here, the excitation current Ie' is larger than the load current Iout. When the excitation current Ie' is smaller than the load current Iout, the operation of the voltage conversion circuit 32 is in the third case which will be described later.

Figure 7:
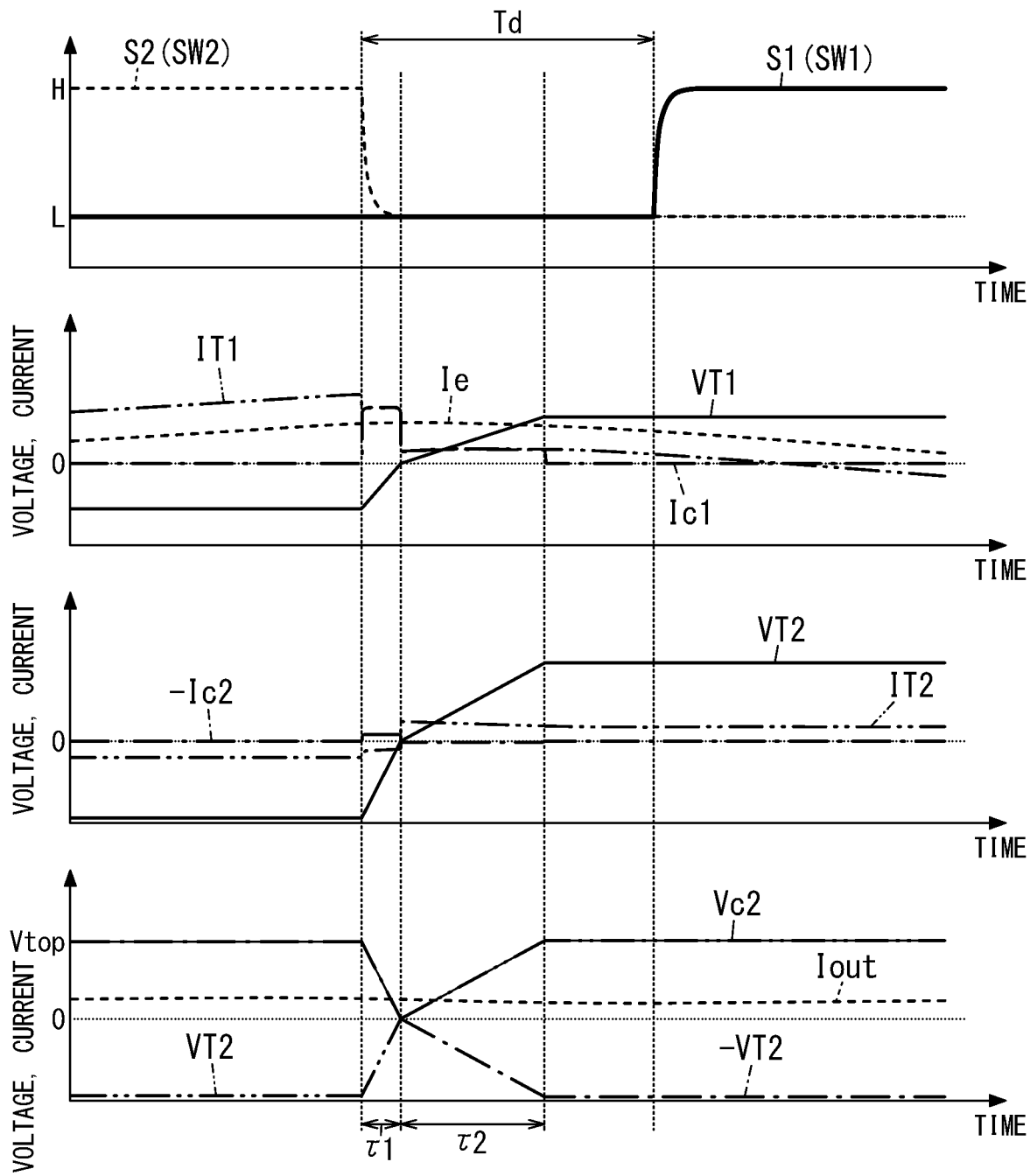
FIG. 7 is a waveform diagram illustrating operation of the voltage conversion circuit in the snubber circuit in the second case.

Next, the second case will be described with reference to FIG. 7.

The second case is a case where during the dead time Td, the polarity of the voltage Vc2 across the second capacitive element C2 is inverted (reaches 0 V) earlier than that of the secondary voltage VT2 across the secondary winding wire 352 (the primary voltage VT1 between both ends of the primary winding wire 351). In the present embodiment, the secondary winding wire 352 is electrically connected to the second capacitive element C2 via the fifth to eighth diodes D5 to D8. Thus, the secondary voltage VT2, along with a reduction of the voltage Vc2, reaches 0 V at substantially the same timing as the voltage Vc2.

Figure 8:
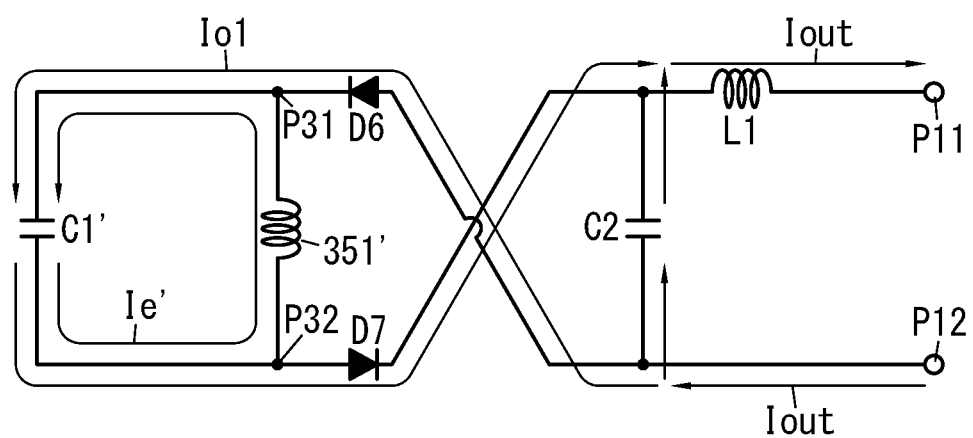
FIG. 8 is an equivalent circuit diagram illustrating a former phase of the inversion operation of the transformer of the voltage conversion circuit in the snubber circuit in the second case.

FIG. 8 shows an equivalent circuit of the voltage conversion circuit 32 during a time period from turning off of the second switch SW2 until the voltage Vc2 across the second capacitive element C2 reaches 0 V.

The first capacitive element C1' is charged with part (current Io1) of the load current Iout and the excitation current Ie', and the second capacitive element C2 is discharged by a remaining current obtained by subtracting the current Io1 from the load current Iout. Since the secondary voltage VT2 decreases along the same slope as the voltage Vc2 across the second capacitive element C2, the following expression [Formula 3] holds true.

$$\frac{Iep' + Io1}{c1'} = \frac{Iout - Io1}{c2} \qquad [\text{Formula 3}]$$

In the Formula 3 above, c1' is a value obtained by secondary conversion of a capacitance value c1 of the first capacitive element C1 (c1'=α 2c1), and c2 is a capacitance value of the second capacitive element C2. The magnitude of the excitation current Ie' during the dead time Td is, strictly speaking, reduced by the first capacitive element C1, but since the inductance of the primary winding wire 351 is sufficiently large, description is given assuming that the excitation current Ie' is fixed at the peak value Iep'. Based on the expression [Formula 3], the current Io1 is expressed by the following [Formula 4].

$$Io1 = \frac{c1'Iout - c2Iep'}{c1' + c2} \qquad [\text{Formula 4}]$$

A time τ1 required for the voltage Vc2 across the second capacitive element C2 to decrease from a top value Vtop before the dead time Td to 0 V is expressed by the following expression [Formula 5].

$$\tau 1 =_t \frac{c1' + c2}{Iep' + Iout} Vout \qquad [\text{Formula 5}]$$

The output voltage Vout is reduced during the dead time Td, but a reduction width thereof is small. Therefore, in the embodiment, description is given assuming that the output voltage Vout is a direct-current voltage. Moreover, the inductor L1 causes ripple in the load current Iout during the dead time Td, but the ripple value is small. Therefore, in the embodiment, description is given assuming that the load current Iout is a direct current.

When the polarity of the secondary voltage VT2 is inverted, the fifth and eighth diodes D5 and D8 are turned on. An equivalent circuit of the voltage conversion circuit 32 in this case is shown in FIG. 6. Similarly to the first case, after the polarity of the secondary voltage VT2 is inverted, A combined capacitance of the first capacitive element C1' and the second capacitive element C2 is charged with a current obtained by subtracting the load current Iout from the excitation current Ie'. Here, the excitation current Ie' is larger than the load current Iout. When the excitation current Ie' is smaller than the load current Iout, the operation of the voltage conversion circuit 32 is in the third case which will be described later.

Moreover, a time τ2 required for the voltage Vc2 across the second capacitive element C2 to increase from 0 V to the top value Vtop is expressed by the following [Formula 6].

$$\tau 2 = \frac{c1' + c2}{Iep' - Iout} Vout \qquad [\text{Formula 6}]$$

In order to realize soft switching, the inversion operation of the transformer 35 has to be completed within the dead time Td. That is, the dead time Td is set to be a time longer than an inversion time τ0 as the sum of the times τ1 and τ2, thereby realizing the soft switching. The inversion time τ0 is expressed by the following [Formula 7].

$$\tau 0 = \tau 1 + \tau 2 = \frac{2Iep'}{(Iep' + Iout)(Iep' - Iout)} (c1' + c2) Vout \qquad [\text{Formula 7}]$$

Figure 9:
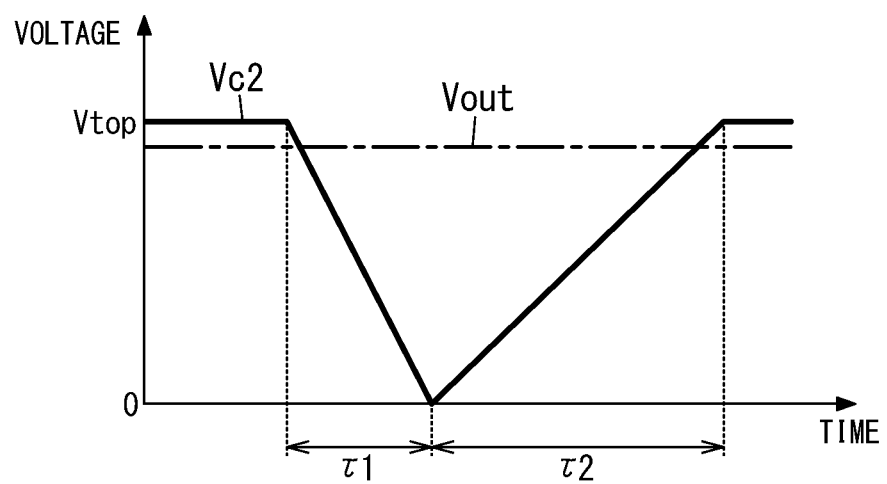
FIG. 9 is a voltage waveform diagram illustrating a voltage across and an output voltage of a second capacitive element of the voltage conversion circuit in the snubber circuit.

Moreover, as illustrated in FIG. 9, the voltage Vc2 across the second capacitive element C2 decreases to 0 V during the dead time Td. The output voltage Vout is the average value of the voltage Vc2. Thus, the output voltage Vout decreases below the top value Vtop of the voltage Vc2 due to a drop during the dead time Td. The top value Vtop of the voltage Vc2 is expressed by the following expression [Formula 8], and the output voltage Vout is expressed by the following expression [Formula 9].

$$V_{top} = \frac{n2}{n1} \frac{V_{in}}{2} \qquad \text{[Formula 8]}$$

$$V_{out} = \frac{(T/2 - \tau1 - \tau2)V_{top} + (\tau1 + \tau2)\frac{V_{top}}{2}}{T/2} = \left(1 - \frac{\tau1 + \tau2}{T}\right)\frac{n2}{n1}\frac{V_{in}}{2} \qquad \text{[Formula 9]}$$

In the above Formula 9, T is a switching cycle of the first switch SW1 and the second switch SW2.

When the output voltage Vout exceeds the bus voltage V1 between the pair of primary-side voltage points P11 and P12 of the main circuit 2, electrical energy is regenerated from the voltage conversion circuit 32 in the main circuit 2. Specifically, when the secondary voltage VT2 (top value Vtop of the voltage Vc2) exceeds the output voltage Vout, electrical energy is regenerated in the main circuit 2. In other words, when the input voltage Vin exceeds a prescribed regeneration starting voltage, electrical energy is regenerated in the main circuit 2.

Figure 10:
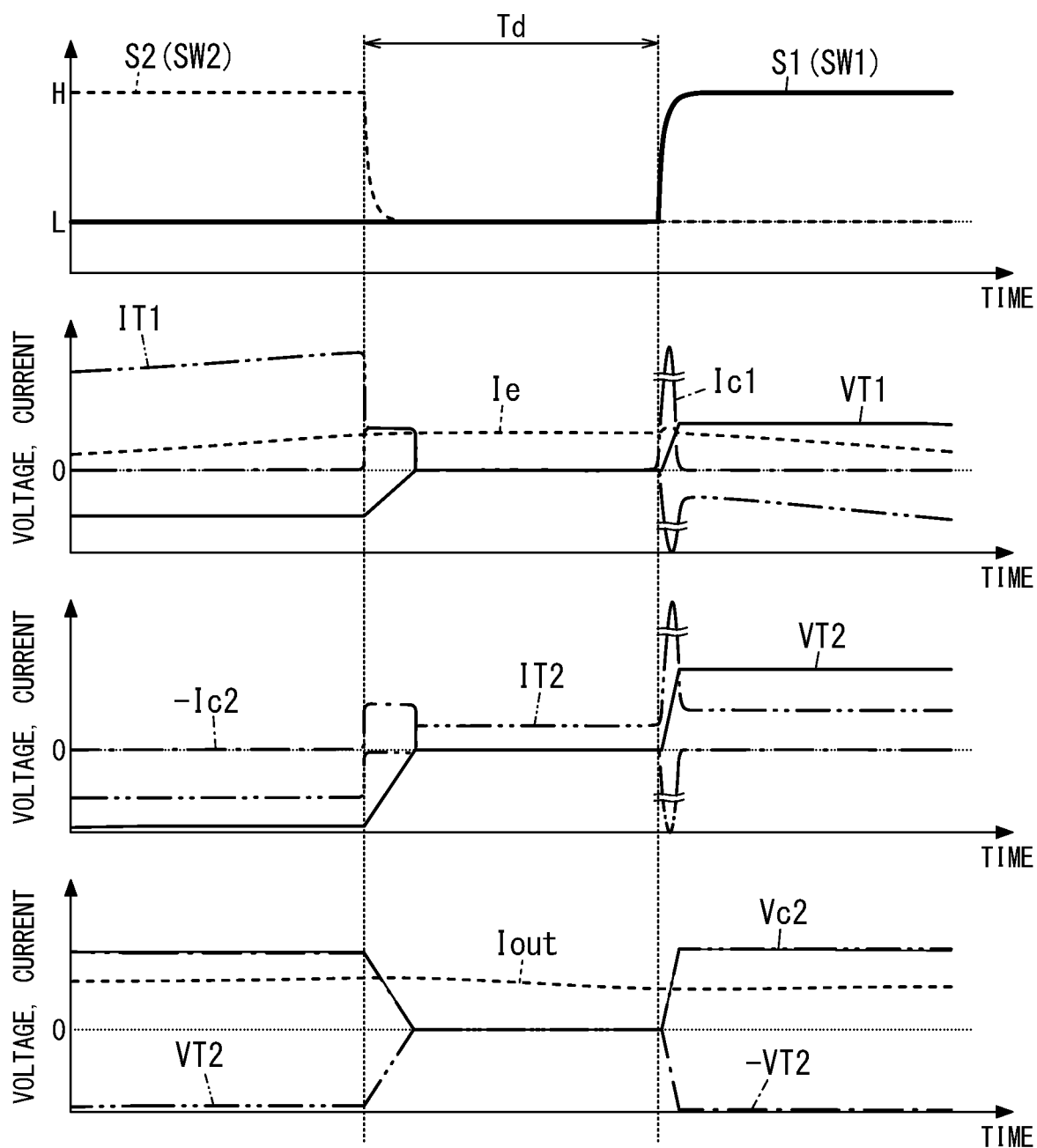
FIG. 10 is a waveform diagram illustrating operation of the voltage conversion circuit in the snubber circuit.

Next, the third case will be described with reference to FIG. 10.

As described above, the third case is a case where during the dead time Td, the excitation current Ie' is smaller than the load current Iout. In the above-described first and second cases, the excitation current Ie' is larger than the load current Iout. Thus, after the polarity of the secondary voltage VT2 is inverted, The first capacitive element C1' and the second capacitive element C2 are charged with a current obtained by subtracting the load current Iout from the excitation current Ie'. However, when the excitation current Ie' is smaller than the load current Iout, the first capacitive element C1' and the second capacitive element C2 are not charged but discharged after the polarity of the secondary voltage VT2 is inverted. Thus, the secondary voltage VT2 is 0 V, and thus, all the fifth to eighth diodes D5 to D8 are in the ON state, and the voltage Vc2 across the second capacitive element C2 is 0 V. The excitation current Ie' is canceled out by part of the load current Iout, and the rest of the load current Iout circulates in the rectifier circuit 36. Thus, in the third case where the excitation current Ie' is smaller than the load current Iout, inversion operation of the transformer 35 is not completed, resulting in hard switching.

That is, as a first condition for realizing soft switching, the circuit constant and the like of the snubber circuit 3 have to be set such that the excitation current Ie' is larger than the load current Iout. Thus, the operation of the voltage conversion circuit 32 is in the first case or second case. Moreover, when the relationship among the capacitance values c1' and c2, the peak value Iep' of the excitation current Ie' and the load current Iout satisfies the condition expressed by the following expression [Formula 10], the operation of the voltage conversion circuit 32 is in the second case, and if the condition is not satisfied, the operation is in the first case.

$$\frac{c2}{c1'} Iep' < Iout \qquad \text{[Formula 10]}$$

Moreover, as a second condition for realizing the soft switching, the dead time Td has to be set to be longer than the inversion time $\tau0(=\tau1+\tau2)$. Note that from the expression [Formula 10], the operation of the voltage conversion circuit 32 is in the first case if the load current Iout is equal to or smaller than the prescribed value. Since the load current Iout is smaller in the first case than in the second case, the inversion time of the transformer 35 is reduced. Thus, if the condition that the dead time Td>inversion time $\tau0$ in the second case is not satisfied, soft switching is realized even in the first case.

Moreover, when the input voltage Vin which is a voltage across the capacitor C10 exceeds the prescribed regeneration starting voltage, the snubber circuit 3 regenerates electrical energy in the main circuit 2. The circuit constant of the snubber circuit 3 is set such that the regeneration starting voltage corresponds to a larger value than the absolute value of the secondary-side voltage V2 between the pair of secondary-side voltage points P21 and P22 of the main circuit 2. That is, the clamp circuit 31 of the snubber circuit 3 is configured to absorb electrical energy of a ringing component between the pair of secondary-side voltage points P21 and P22. This enables the snubber circuit 3 to regenerate only ringing components without regenerating normal voltage (secondary-side voltage V2) applied between the pair of secondary-side voltage points P21 and P22.

(4) Variation

The above-mentioned embodiment is merely an example of the present disclosure. The present disclosure is not limited to the above-mentioned embodiment, but as embodiments other than the above-mentioned embodiment, various modifications may be made depending on design and the like without departing from the scope of technical ideas of the present disclosure. Variations of the embodiment will be described below.

The power storage system including the power conversion system 1 and the storage battery 5 is not limited to the use in non-dwelling facilities but may be introduced into, for example, dwelling houses or may be applied to objects such as an electric vehicle other than facilities. Moreover, the power conversion system 1 is not limited to the use for electric power conversion between the power system 4 and the storage battery 5 but may be used for electric power conversion between a power generating facility such as a photovoltaic generator or a fuel cell and a power system 4 or a load.

Moreover, the power conversion system 1 is not limited to a configuration for bidirectionally converting electric power but may be configured to only unidirectionally convert electric power, for example, from the pair of primary-side terminals T11 and T12 to the pair of secondary-side terminals T21 and T22.

Moreover, in the voltage conversion circuit 32 of the snubber circuit 3, the second switch SW2 is not limited to the MOSFET but may be, for example, a diode. In this case, the second switch SW2 is provided in the same direction as a parasitic diode of the MOSFET, that is, is connected such that the cathode is connected to the source of the first switch and the anode is connected to the primary winding wire 351 via the smoothing capacitor C11.

Moreover, the voltage conversion circuit 32 may regenerate electrical energy absorbed by the clamp circuit 31 via the pair of secondary-side voltage points P21 and P22 of the main circuit 2 from a primary-side location in the main circuit 2. The primary-side location electrically differs from the pair of primary-side voltage points P11 and P12 of the main circuit 2.

It is not essential that the first capacitive element C1 is electrically connected in parallel to the primary winding wire 351 of the transformer 35. The first capacitive element C1 is at least electrically connected to the primary winding wire 351. For example, the first capacitive element C1 may be electrically connected in parallel to the first switch SW1 or the second switch SW2.

Moreover, the first capacitive element C1 and the second capacitive element C2 at least include capacitance components, are not limited to capacitors, but may be, for example, parasitic capacitance.

The duty of each of the first switch SW1 and the duty of the second switch SW2 are not necessarily the same but may differ from each other. For example, the ratio of the ON time of the first switch SW1 to the ON time of the second switch SW2 may be 6:4.

Moreover, a control method of the first switch SW1 and the second switch SW2 is not limited to duty control of causing the first switch SW1 and the second switch SW2 to operate at a prescribed duty. For example, the control circuit 33 may control the first switch SW1 and the second switch SW2 by feedback control of the input voltage Vin such that the input voltage Vin is a prescribed voltage.

Moreover, the main circuit 2 is configured such that during operation of the main circuit 2, a secondary-side voltage V2 having an alternately inverting polarity is generated between the pair of secondary-side voltage points P21 and P22 but is not limited to this circuit configuration. For example, the main circuit 2 may have a high-frequency isolation transformer equipped with a center tap and may be configured such that during operation of the main circuit 2, the secondary-side voltage V2 which is a direct-current voltage is generated between the pair of secondary-side voltage point on a secondary side of the transformer. Moreover, the main circuit 2 may include a full-bridge circuit on a secondary side of the high-frequency isolation transformer and may be configured such that during operation of the main circuit 2, the secondary-side voltage V2 which is a direct-current voltage is generated between the output ends (between the pair of secondary-side voltage points) of the full-bridge circuit.

Moreover, in the embodiment, a case where the power system 4 corresponds to a single phase alternating current has been described, but this should not be construed as limiting. The power system 4 may correspond to, for example, a three-phase alternating current.

(5) Summary

As described above, a snubber circuit 3 of a first aspect includes a clamp circuit 31 and a voltage conversion circuit 32. The clamp circuit 31 is configured to absorb electrical energy of a main circuit 2 from a pair of secondary-side voltage points P21 and P22 on a secondary side of the main circuit 2 to clamp a voltage between the pair of secondary-side voltage points P21 and P22. The main circuit 2 is of insulating type. The main circuit 2 is configured to perform electric power conversion. The voltage conversion circuit 32 is electrically connected to the clamp circuit 31 and a pair of primary-side voltage points P11 and P12 on a primary side of the main circuit 2. The voltage conversion circuit 32 is of insulating type. The voltage conversion circuit 32 is configured to subject, to direct-current conversion, a direct-current voltage generated by the clamp circuit 31 absorbing the electrical energy to obtain converted direct-current voltage and output the converted direct-current voltage to the pair of primary-side voltage points P11 and P12. The voltage conversion circuit 32 includes a transformer 35, a first capacitance component (first capacitive element C1) electrically connected to a primary winding wire 351 of the transformer 35, and a second capacitance component (second capacitive element C2) electrically connected to a secondary winding wire 352 of the transformer 35.

With this configuration, when ringing occurs in a voltage (secondary-side voltage V2) between the pair of secondary-side voltage points P21 and P22, the snubber circuit 3 absorbs electrical energy of the main circuit 2 by using the clamp circuit 31 to clamp the secondary-side voltage V2. The voltage conversion circuit 32 performs direct current conversion of a direct-current voltage (input voltage Vin) generated by absorbing electrical energy from the main circuit 2 by using the clamp circuit 31 into an output voltage Vout and outputs the output voltage Vout to the pair of primary-side voltage points P11 and P12 of the main circuit 2. That is, the snubber circuit 3 regenerates the electrical energy absorbed from the main circuit 2 when ringing occurs in the secondary-side voltage V2 from the primary-side voltage points P11 and P12 of the main circuit 2 in the main circuit 2. Thus, the snubber circuit 3 more effectively uses electrical energy than an RCD snubber circuit configured to convert absorbed electrical energy into heat energy for consumption, and thus, it is possible to reduce loss at the snubber circuit 3. Moreover, the voltage conversion circuit 32 includes a transformer 35 and a first capacitance component and a second capacitance component which are electrically connected to the transformer 35, and it is possible to realize soft switching based on partial resonance. This enables the snubber circuit 3 to suppress ringing in the voltage conversion circuit 32 and to further reduce loss at the snubber circuit 3.

Moreover, since the voltage conversion circuit 32 is of insulating type, the voltage conversion circuit 32 can regenerate electrical energy on an arbitrary main path in the main circuit 2. Furthermore, adopting an autonomous control circuit 33 for controlling the voltage conversion circuit 32 enables the circuit dimension of the snubber circuit 3 to be reduced.

In a snubber circuit 3 of a second aspect referring to the first aspect, the voltage conversion circuit 32 is preferably configured such that a secondary conversion value (excitation current Ie') of an excitation current Ie flowing through the primary winding wire 351 of the transformer 35 is larger than a load current Iout supplied via the pair of primary-side voltage points P11 and P12 to the main circuit 2.

This configuration enables the snubber circuit 3 to complete the inversion operation of the transformer 35 within the dead time Td, thereby suppressing hard switching at the voltage conversion circuit 32.

In a snubber circuit 3 of a third aspect referring to the first or second aspect, the voltage conversion circuit 32 is preferably configured to operate at a drive frequency higher than a drive frequency of the main circuit 2.

This configuration enables the snubber circuit 3 to improve responsiveness of absorption and regeneration of the electrical energy to the ringing in the secondary-side voltage V2 between the pair of secondary-side voltage points P21 and P22.

In a snubber circuit 3 of a fourth aspect referring to any one of the first to third aspects, the voltage conversion circuit 32 preferably includes a half-bridge connection of a first switch SW1 and a second switch SW2. In this case, the first switch SW1 and the second switch SW2 are electrically connected to the primary winding wire 351 of the transformer 35.

This configuration simplifies the configuration of the snubber circuit 3. Note that this configuration is not an essential configuration for the snubber circuit 3. The voltage conversion circuit 32 may include a full-bridge configuration of four switches.

In a snubber circuit 3 of a fifth aspect referring to any one of the first to fourth aspects, the first capacitance component (first capacitive element C1) is preferably electrically connected in parallel to the primary winding wire 351 of the transformer 35.

This configuration enables the snubber circuit 3 to realize soft switching based on partial resonance, to suppress ringing in the voltage conversion circuit 32, and to reduce loss at the snubber circuit 3. Note that this configuration is not an essential configuration for the snubber circuit 3. The first capacitance component (first capacitive element C1) may be electrically connected in parallel to the first switch SW1 or the second switch SW2.

In a snubber circuit 3 of an sixth aspect referring to any one of the first to fifth aspects, the voltage conversion circuit 32 preferably includes a rectifier circuit 36 configured to rectify a voltage across the secondary winding wire 352 of the transformer 35. In this case, the second capacitance component (second capacitive element C2) is preferably electrically connected between output ends of the rectifier circuit 36.

This configuration enables the snubber circuit 3 to realize soft switching based on partial resonance, to suppress ringing in the voltage conversion circuit 32, and to reduce loss at the snubber circuit 3.

In a snubber circuit 3 of an seventh aspect referring to any one of the first to sixth aspects, the voltage conversion circuit 32 preferably includes an inductor L1 electrically connected between the second capacitance component (second capacitive element C2) and at least one of the pair of primary-side voltage points P11 and P12.

This configuration enables the snubber circuit 3 to stabilize the output voltage Vout.

In a snubber circuit 3 of an eighth aspect referring to any one of the first to seventh aspects, the pair of secondary-side voltage points P21 and P22 is preferably a connection point of a secondary side of a transformer 26 (high-frequency isolation transformer) included in the main circuit 2 and a second converter 22 (inverter circuit) configured to subject, to alternating-current conversion, an alternating-current voltage (secondary-side voltage V2) on the secondary side of the transformer 26. The clamp circuit 31 is preferably configured to absorb electrical energy of a ringing component between the pair of secondary-side voltage points P21 and P22.

This configuration enables the snubber circuit 3 to regenerate only ringing components without regenerating normal voltage (secondary-side voltage V2) applied between the pair of secondary-side voltage points P21 and P22. This enables the snubber circuit 3 to relatively reduce influence on the operation of the main circuit 2.

A power conversion system 1 of a ninth aspect includes the snubber circuit 3 of any one of the first to eighth aspects and the main circuit 2.

With this configuration, the snubber circuit 3 more effectively uses electrical energy than an RCD snubber circuit, and thus, it is possible to suppress loss at the snubber circuit 3 to a low level. As a result, the loss in the snubber circuit 3 in the power conversion system 1 is suppressed to a low level, and as the entirety of the power conversion system 1, the conversion efficiency of the electric power can be improved. In particular, when the main circuit 2 performs electric power conversion of relatively large electric power, heat generation by the snubber circuit 3 is reduced, which also leads to downsizing and simplification of the heat dissipation structure of the snubber circuit 3.

In a power conversion system 1 of a tenth aspect referring to the ninth aspect, the main circuit 2 includes at least two primary-side terminals T11 and T12, at least two secondary-side terminals T21 and T22, a high-frequency isolation transformer 35 electrically connected between the at least two primary-side terminals T11 and T12 and the at least two secondary-side terminals T21 and T22, the main circuit being configured to convert electric power between the at least two primary-side terminals T11 and T12 and the at least two secondary-side terminals T21 and T22 via the high-frequency isolation transformer 35.

This configuration enables the power conversion system 1 to realize the main circuit 2 of insulating type with a relatively simple circuit configuration including a high-frequency isolation transformer.

REFERENCE SIGNS LIST

1 POWER CONVERSION SYSTEM
2 MAIN CIRCUIT
22 SECOND CONVERTER 22 (INVERTER CIRCUIT)
26 TRANSFORMER (HIGH-FREQUENCY ISOLATION TRANSFORMER)
3 SNUBBER CIRCUIT
31 CLAMP CIRCUIT
32 VOLTAGE CONVERSION CIRCUIT
35 TRANSFORMER
351 PRIMARY WINDING WIRE
352 SECONDARY WINDING WIRE
36 RECTIFIER CIRCUIT
C1 FIRST CAPACITIVE ELEMENT (FIRST CAPACITANCE COMPONENT)
C2 SECOND CAPACITIVE ELEMENT (SECOND CAPACITANCE COMPONENT)
SW1 FIRST SWITCH
SW2 SECOND SWITCH
Ie' EXCITATION CURRENT
Iout LOAD CURRENT
P21, P22 SECONDARY-SIDE VOLTAGE POINT
P11, P12 PRIMARY-SIDE VOLTAGE POINT
T11, T12 PRIMARY-SIDE TERMINAL
T21, T22 SECONDARY-SIDE TERMINAL

The invention claimed is:
1. A snubber circuit, comprising:
a clamp circuit configured to absorb electrical energy of a main circuit from a pair of secondary-side voltage points on a secondary side of the main circuit to clamp a voltage between the pair of secondary-side voltage points, the main circuit being of insulating type, the main circuit being configured to perform electric power conversion; and
a voltage conversion circuit electrically connected to the clamp circuit and a pair of primary-side voltage points on a primary side of the main circuit, the voltage conversion circuit being of insulating type, the voltage conversion circuit being configured to subject, to direct-current conversion, a direct-current voltage generated by the clamp circuit absorbing the electrical energy to obtain converted direct-current voltage and output the converted direct-current voltage to the pair of primary-side voltage points,
the voltage conversion circuit including a transformer, a first capacitance component electrically connected to a primary winding wire of the transformer, and a second capacitance component electrically connected to a secondary winding wire of the transformer, and the voltage conversion circuit being configured such that a secondary conversion value of an excitation current flowing through the primary winding wire of the transformer is larger than a load current supplied via the pair of primary-side voltage points to the main circuit.

2. The snubber circuit of claim 1, wherein the voltage conversion circuit includes a half-bridge connection of a first switch and a second switch, and the first switch and the second switch are electrically connected to the primary winding wire of the transformer.

3. The snubber circuit of claim 1, wherein the first capacitance component is electrically connected in parallel to the primary winding wire of the transformer.

4. The snubber circuit of claim 1, wherein the voltage conversion circuit includes a rectifier circuit configured to rectify a voltage across the secondary winding wire of the transformer, and the second capacitance component is electrically connected between output ends of the rectifier circuit.

5. The snubber circuit of claim 1, wherein the voltage conversion circuit includes an inductor electrically connected between the second capacitance component and at least one of the pair of primary-side voltage points.

6. The snubber circuit of claim 1, wherein the pair of secondary-side voltage points is a connection point of:
- a secondary side of a high-frequency isolation transformer included in the main circuit, and
- an inverter circuit configured to subject, to alternating-current conversion, an alternating-current voltage on the secondary side of the high-frequency isolation transformer, and the clamp circuit is configured to absorb the electrical energy of a ringing component between the pair of secondary-side voltage points.

7. The snubber circuit of claim 1, wherein the voltage conversion circuit is configured to operate at a drive frequency higher than a drive frequency of the main circuit.

8. The snubber circuit of claim 1, wherein the voltage conversion circuit includes a half-bridge connection of a first switch and a second switch, and the first switch and the second switch are electrically connected to the primary winding wire of the transformer.

9. A snubber circuit, comprising:

a clamp circuit configured to absorb electrical energy of a main circuit from a pair of secondary-side voltage points on a secondary side of the main circuit to clamp a voltage between the pair of secondary-side voltage points, the main circuit being of insulating type, the main circuit being configured to perform electric power conversion; and a voltage conversion circuit electrically connected to the clamp circuit and a pair of primary-side voltage points on a primary side of the main circuit, the voltage conversion circuit being of insulating type, the voltage conversion circuit being configured to subject, to direct-current conversion, a direct-current voltage generated by the clamp circuit absorbing the electrical energy to obtain converted direct-current voltage and output the converted direct-current voltage to the pair of primary-side voltage points, the voltage conversion circuit including a transformer, a first capacitance component electrically connected to a primary winding wire of the transformer, and a second capacitance component electrically connected to a secondary winding wire of the transformer, and the voltage conversion circuit being configured to operate at a drive frequency higher than a drive frequency of the main circuit.

10. The snubber circuit of claim 9, wherein the voltage conversion circuit includes a half-bridge connection of a first switch and a second switch, and the first switch and the second switch are electrically connected to the primary winding wire of the transformer.

11. A electric power conversion system, comprising:

a snubber circuit; and a main circuit, the snubber circuit including:
- a clamp circuit configured to absorb electrical energy of the main circuit from a pair of secondary-side voltage points on a secondary side of the main circuit to clamp a voltage between the pair of secondary-side voltage points, the main circuit being of insulating type, the main circuit being configured to perform electric power conversion; and
- a voltage conversion circuit electrically connected to the clamp circuit and a pair of primary-side voltage points on a primary side of the main circuit, the voltage conversion circuit being of insulating type, the voltage conversion circuit being configured to subject, to direct-current conversion, a direct-current voltage generated by the clamp circuit absorbing the electrical energy to obtain converted direct-current voltage and output the converted direct-current voltage to the pair of primary-side voltage points, the voltage conversion circuit including a transformer, a first capacitance component electrically connected to a primary winding wire of the transformer, and a second capacitance component electrically connected to a secondary winding wire of the transformer, and the voltage conversion circuit being configured such that a secondary conversion value of an excitation current flowing through the primary winding wire of the transformer is larger than a load current supplied via the pair of primary-side voltage points to the main circuit.

12. The electric power conversion system of claim 11, wherein the main circuit includes:

at least two primary-side terminals, at least two secondary-side terminals, and a high-frequency isolation transformer electrically connected between the at least two primary-side terminals and the at least two secondary-side terminals, the main circuit being configured to convert electric power between the at least two primary-side terminals and the at least two secondary-side terminals via the high-frequency isolation transformer.

* * * * *